US012447967B2

(12) United States Patent
Hirosawa et al.

(10) Patent No.: US 12,447,967 B2
(45) Date of Patent: Oct. 21, 2025

(54) VEHICLE CONTROL DEVICE, OPERATION METHOD OF VEHICLE CONTROL DEVICE, AND STORAGE MEDIUM

(71) Applicant: HONDA MOTOR CO., LTD., Tokyo (JP)

(72) Inventors: Nozomu Hirosawa, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 17/562,370

(22) Filed: Dec. 27, 2021

(65) Prior Publication Data

US 2022/0212669 A1    Jul. 7, 2022

(30) Foreign Application Priority Data

Jan. 6, 2021    (JP) .................................. 2021-001031

(51) Int. Cl.
*B60W 30/095*    (2012.01)
*B60W 30/12*    (2020.01)
(Continued)

(52) U.S. Cl.
CPC ... *B60W 30/18163* (2013.01); *B60W 2520/10* (2013.01); *B60W 2520/12* (2013.01);
(Continued)

(58) Field of Classification Search
CPC ....... B60W 30/18163; B60W 2520/10; B60W 2520/12; B60W 2552/10;
(Continued)

(56) References Cited

U.S. PATENT DOCUMENTS 11,396,297 B2    7/2022  Kanoh
2007/0142995 A1*    6/2007  Wotlermann ...... B60K 31/0008
701/96
(Continued)

FOREIGN PATENT DOCUMENTS

CN    110435650 A    11/2019
JP    2017-117186 A    6/2017
(Continued)

OTHER PUBLICATIONS

Japanese Office Action for Japanese Patent Application No. 2021-001031 mailed Nov. 25, 2022 (partially translated).
(Continued)

*Primary Examiner* — Rachid Bendidi
*Assistant Examiner* — Hossam M Abd El Latif
(74) *Attorney, Agent, or Firm* — Thomas Horstemeyer, LLP (57) ABSTRACT

A device comprising: an acquisition unit that acquires surrounding information of a self-vehicle; and a control unit that controls traveling of the self-vehicle based on the surrounding information, wherein the control unit estimates whether a traveling speed of the self-vehicle will be equal to or less than a predetermined speed based on a relative speed between a traveling speed of the self-vehicle and a traveling speed of another vehicle traveling in a merging lane merging into a traveling lane in which the self-vehicle is traveling and based on a relative distance between the self-vehicle and the other vehicle, and when estimating that the traveling speed of the self-vehicle will be equal to or less than the predetermined speed, disables an automatic lane change operation of the self-vehicle to an adjacent lane adjacent to the traveling lane.

8 Claims, 9 Drawing Sheets

(51) Int. Cl.
  *B60W 30/18* (2012.01)
  *B60W 60/00* (2020.01)
(52) U.S. Cl.
  CPC ... *B60W 2552/10* (2020.02); *B60W 2554/801* (2020.02); *B60W 2554/802* (2020.02); *B60W 2554/803* (2020.02); *B60W 2554/804* (2020.02)
(58) Field of Classification Search
  CPC ..... B60W 2554/801; B60W 2554/802; B60W 2554/803; B60W 2554/804; B60W 2754/30; B60W 30/0956; B60W 30/12; B60W 60/0013; B60W 30/0953; B60W 2554/4042; B60W 2554/4045; B60W 60/001
  USPC .......................................................... 701/26
  See application file for complete search history.

(56) References Cited

U.S. PATENT DOCUMENTS

| | | | | |
|---|---|---|---|---|
| 2017/0240176 | A1* | 8/2017 | Aoki | B60W 50/082 |
| 2017/0313311 | A1* | 11/2017 | Niino | B60W 40/04 |
| 2019/0072970 | A1* | 3/2019 | Izumori | B60W 30/18163 |
| 2019/0375412 | A1* | 12/2019 | Ishioka | B60W 10/18 |
| 2019/0389461 | A1* | 12/2019 | Ohmura | B60W 30/146 |
| 2020/0070659 | A1* | 3/2020 | Okada | B60T 7/042 |
| 2020/0180636 | A1* | 6/2020 | Oh | B60Q 1/346 |
| 2020/0180641 | A1* | 6/2020 | Hashimoto | B60W 30/18163 |
| 2020/0247412 | A1* | 8/2020 | Wang | G02B 27/01 |
| 2020/0385003 | A1* | 12/2020 | Huh | B60W 30/18072 |
| 2020/0398849 | A1 | 12/2020 | Kanoh | |

FOREIGN PATENT DOCUMENTS

| | | |
|---|---|---|
| WO | 2018/189844 A1 | 10/2018 |
| WO | 2019/163121 A1 | 8/2019 |

OTHER PUBLICATIONS

Chinese Office Action for Chinese Patent Application No. 202111646269.3 mailed May 14, 2025 (partially translated).

* cited by examiner

VEHICLE CONTROL DEVICE, OPERATION METHOD OF VEHICLE CONTROL DEVICE, AND STORAGE MEDIUM

CROSS-REFERENCE TO RELATED APPLICATION(S)

This application claims priority to and the benefit of Japanese Patent Application No. 2021-001031 filed on Jan. 6, 2021, the entire disclosure of which is incorporated herein by reference.

BACKGROUND OF THE INVENTION

Field of the Invention

The present invention relates to a vehicle control device, an operation method of the vehicle control device, and a storage medium, and specifically relates to a vehicle control technology of an automated driving vehicle.

Description of the Related Art

As a technique for automated driving, it is known that a vehicle makes an automatic lane change in order to pass a vehicle ahead, and the vehicle moves to an adjacent lane. On the other hand, Japanese Patent Laid-Open No. 2017-117186 discloses that the speed of a merging target vehicle is adjusted according to the speed of a merging vehicle.

However, in order to make an automatic lane change for passing, the vehicle needs to travel at a certain speed. The conventional technique has a problem that the speed of the self-vehicle decreases due to deceleration for giving way to the other vehicle at the time of merging, and the automatic lane change operation for passing may be stopped halfway.

The present invention has been made with the recognition of the above problem as an impetus, and provides a technique for preventing the automatic lane change operation from being stopped halfway.

SUMMARY OF THE INVENTION

According to one aspect of the present invention, there is provided a vehicle control device that controls a self-vehicle, comprising: an acquisition unit configured to acquire surrounding information of the self-vehicle; and a control unit configured to control traveling of the self-vehicle based on the surrounding information, wherein the control unit estimates whether a traveling speed of the self-vehicle will be equal to or less than a predetermined speed based on a relative speed between a traveling speed of the self-vehicle and a traveling speed of another vehicle traveling in a merging lane merging into a traveling lane in which the self-vehicle is traveling and based on a relative distance between the self-vehicle and the other vehicle, and when estimating that the traveling speed of the self-vehicle will be equal to or less than the predetermined speed, the control unit disables an automatic lane change operation of the self-vehicle to an adjacent lane adjacent to the traveling lane.

BRIEF DESCRIPTION OF THE DRAWINGS

The accompanying drawings illustrating an embodiment of the present invention constitute part of the specification, and are used together with the description to describe the present invention.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Vehicle Configuration>

Figure 1:
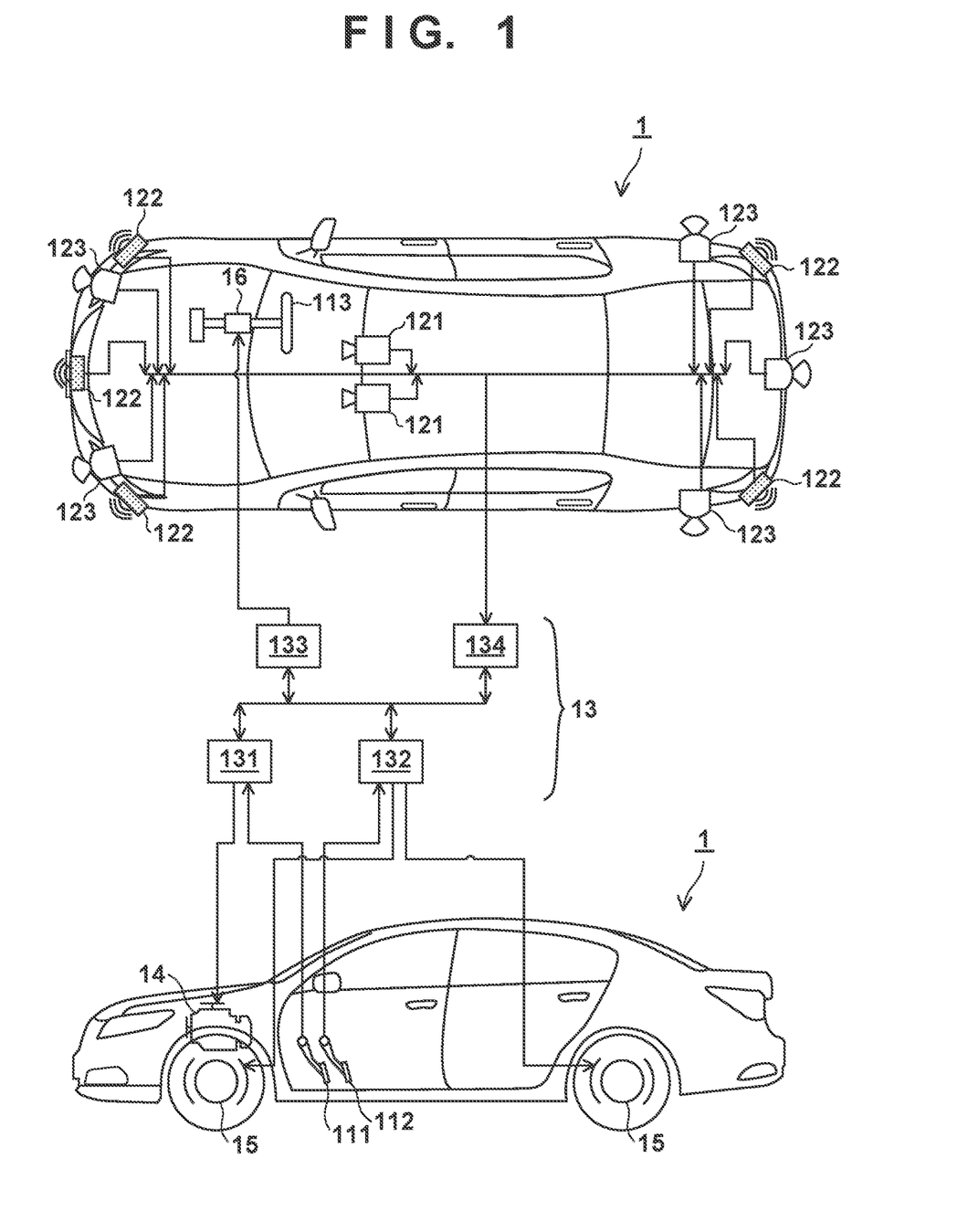
FIG. 1 is a diagram for describing a configuration example of a vehicle according to an embodiment.
Figure 2:
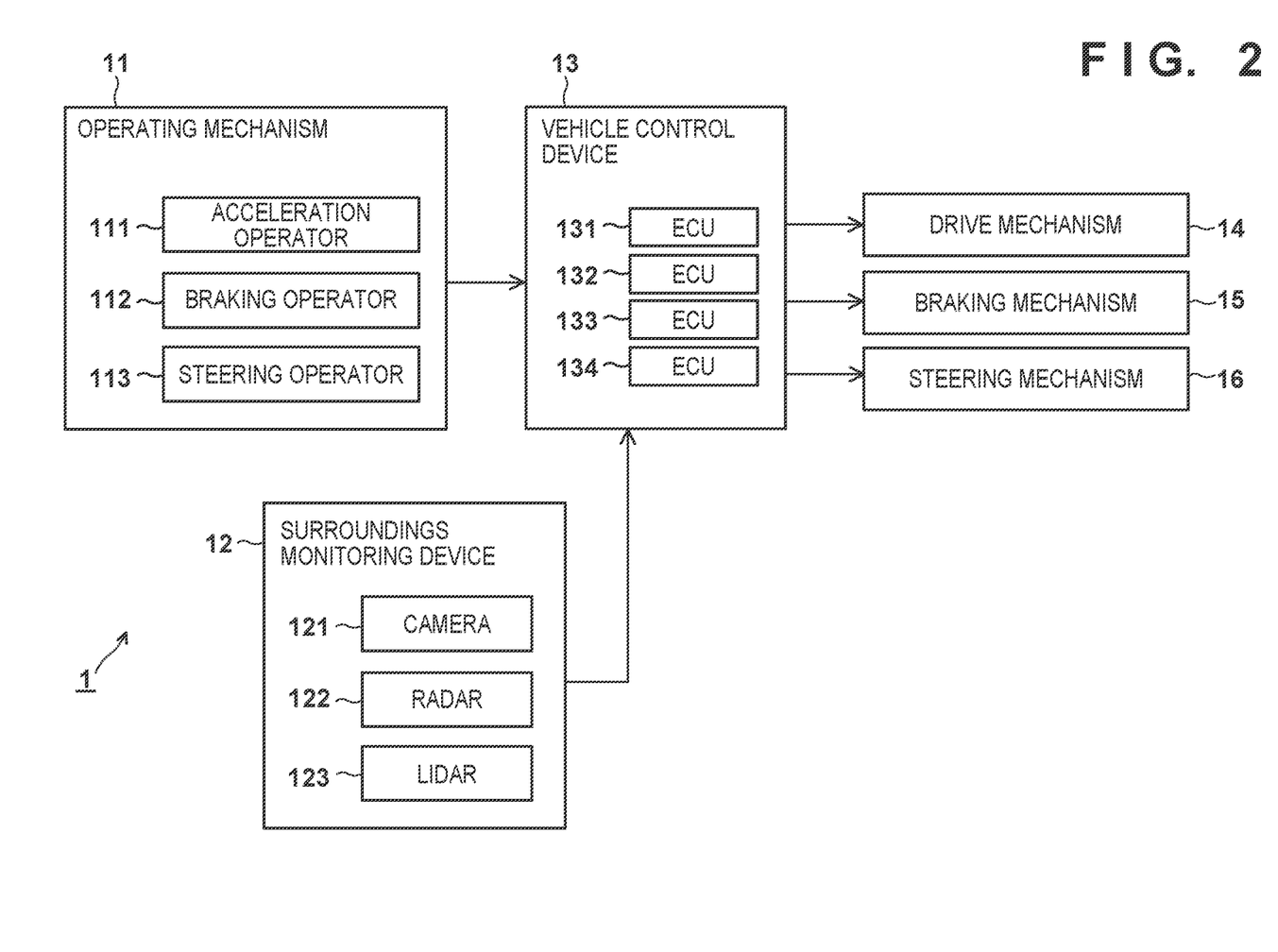
FIG. 2 is a block diagram for describing the configuration example of the vehicle according to the embodiment.

FIGS. 1 and 2 are diagrams for describing a configuration of a vehicle 1 according to a first embodiment. FIG. 1 illustrates arrangement positions of elements described below and a connection relationship between elements, by using a top view and a side view of the vehicle 1. FIG. 2 is a system block diagram of the vehicle 1.

In the following description, expressions such as front/back, up/down, and side (left/right) may be used as expressions indicating directions relative to the vehicle body of the vehicle 1. For example, the term "front" indicates the front of the vehicle body as seen in the front-and-rear direction, and the term "upper" indicates the height direction of the vehicle body.

The vehicle 1 includes an operation mechanism 11, a surroundings monitoring device 12, a vehicle control device 13, a drive mechanism 14, a braking mechanism 15, and a steering mechanism 16. In the present embodiment, the vehicle 1 is a four-wheeled vehicle, but the number of wheels is not limited thereto.

The operating mechanism 11 includes an acceleration operator 111, a braking operator 112, and a steering operator 113. Typically, the acceleration operator 111 is an accelerator pedal, the braking operator 112 is a brake pedal, and the steering operator 113 is a steering wheel. However, these operators 111 to 113 may be of other types such as a lever type and a button type.

The surroundings monitoring device 12 includes a camera 121, a radar 122, and a light detection and ranging (LiDAR) 123, all of which function as sensors for monitoring or detecting the surrounding environment of the vehicle (self-vehicle) 1. The camera 121 is an imaging device using, for example, a CCD image sensor, a CMOS image sensor, or the like. The radar 122 is, for example, a ranging device such as a millimeter wave radar. The LiDAR 123 is, for example, a ranging device such as a laser radar. As illustrated in FIG. 1, these components are disposed at positions where the surrounding environment of the vehicle 1 can be detected, for example, on the front side, the rear side, the upper side, and the lateral sides of the vehicle body.

Examples of the surrounding environment of the vehicle 1 described above include a travel environment of the vehicle 1 and an environment around the vehicle 1 related thereto (extending direction of lanes, travelable areas, colors of traffic signals, etc.), and object information around the vehicle 1 (presence or absence of objects such as other vehicles, pedestrians, and obstacles, and attributes and positions, directions and speeds of movement of the objects, and the like). From this viewpoint, the surroundings monitoring device 12 may be expressed as a detection device or the like for detecting and acquiring the surrounding information of the vehicle 1.

The vehicle control device 13 is capable of controlling the vehicle 1, and controls the mechanisms 14 to 16 on the basis of a signal from the operation mechanism 11 and/or the surroundings monitoring device 12, for example. The vehicle control device 13 includes a plurality of electronic control units (ECUs) 131 to 134. Each ECU includes a CPU, a memory, and a communication interface. Each ECU performs predetermined processing by the CPU on the basis of information (data or electric signal) received via the communication interface, and stores the processing results in the memory or outputs the processing results to another element via the communication interface.

The ECU 131 is an acceleration ECU, and controls the drive mechanism 14 described later based on, for example, the amount of operation of the acceleration operator 111 by the driver. The ECU 132 is a braking ECU, and controls the braking mechanism 15 based on, for example, the amount of operation of the braking operator 112 by the driver. The braking mechanism 15 is, for example, a disc brake provided on each wheel. The ECU 133 is a steering ECU, and controls the steering mechanism 16 based on, for example, the amount of operation of the steering operator 113 by the driver. The steering mechanism 16 includes, for example, a power steering.

The ECU 134 is an analysis ECU provided in correspondence with the surroundings monitoring device 12. The ECU 134 performs predetermined analysis/processing on the basis of the surrounding environment of the vehicle 1 obtained by the surroundings monitoring device 12, and outputs the results to the ECUs 131 to 133.

That is, the ECUs 131 to 133 can control the mechanisms 14 to 16 on the basis of a signal from the ECU 134. According to this configuration, the vehicle control device 13 can perform travel control of the vehicle 1 in correspondence with the surrounding environment, and perform automated driving, for example.

Herein, the automated driving means that some or all of the driving operations (acceleration, braking, and steering) are performed not by the driver but by the vehicle control device 13. That is, the concept of the automated driving includes a mode in which all of the driving operations are performed by the vehicle control device 13 (so-called fully automated driving) and a mode in which only some of the driving operations are performed by the vehicle control device 13 (so-called driving assistance). Examples of the driving assistance include a vehicle speed control (automatic cruise control) function, an inter-vehicle distance control (adaptive cruise control) function, a lane departure prevention assist (lane keeping assist) function, a collision prevention assist function, and the like.

The vehicle control device 13 is not limited to this configuration. For example, semiconductor devices such as application specific integrated circuits (ASICs) may be used for the ECUs 131 to 134. That is, the functions of the ECUs 131 to 134 can be realized by both hardware and software. Some or all of the ECUs 131 to 134 may be configured by a single ECU.

<Travel Control>

The vehicle control device 13 can execute a plurality of travel controls. The plurality of travel controls is classified into a plurality of stages (levels) in accordance with the degree of automation (automation rate) in vehicle control and the degree of a task requested to a vehicle occupant (driver) (the degree of involvement in vehicle operation by the vehicle occupant).

Each of the plurality of travel controls is set with a vehicle control related to steering and braking including acceleration, deceleration, and lane change of the vehicle, and tasks required of a vehicle occupant (driver). The tasks requested to the vehicle occupant includes an operation requested to the vehicle occupant to respond to the request for monitoring the surroundings of the vehicle, for example, steering wheel gripping (hands-off or hands-on), surroundings monitoring (eyes-off or eyes-on), a driving-mode switch, and the like.

The vehicle control device 13 can execute the automated driving of the vehicle 1 by any one of the plurality of travel controls including the following first travel control and second travel control, based on information of the surrounding environment of the vehicle 1 (external environment information) acquired by the surroundings monitoring device 12.

The first travel control is a travel control in which the automation rate is relatively low or the degree of involvement in vehicle operation required of the driver is relatively increased. Under the first travel control, the vehicle 1 is driven mainly by the driver, and the driver needs to monitor the surroundings of the vehicle 1 and grip the steering wheel. The first travel control is, for example, a control that can be executed on a general road or the like away from an expressway. In the first travel control, driving assistance such as a vehicle speed control (automatic cruise control) function, an inter-vehicle distance control (adaptive cruise control) function, a lane deviation prevention assist (lane keeping assist) function, and a collision prevention assist function may be performed.

The second travel control is a travel control in which the automation rate is relatively high or the degree of involvement in vehicle operation required of the driver is relatively reduced. Under the second travel control, the vehicle 1 is driven mainly by the vehicle control device 13 (vehicle system), and the driver needs to monitor the surroundings of the vehicle 1 but does not need to grip the steering wheel. However, during the second travel control, the driver needs to be prepared to grip the steering wheel in case of receiving a request for gripping the steering wheel from the vehicle control device 13 (vehicle system).

In addition, the plurality of travel controls merely needs to be relatively different in automation rate or relatively different in the degree of involvement in vehicle operation required of the driver, and the specific contents of the travel controls are not limited.

<Lane Change Control>

The vehicle control device 13 can execute a plurality of lane change controls including the first lane change control and the second lane change control. The first lane change control is, for example, an automatic lane change control performed by the system, that is, a control in which the vehicle control device 13 makes a lane change on the basis of self-determination. The second lane change control is, for example, an automated driving control performed by a vehicle occupant (driver), and is a control in which the vehicle control device 13 makes an automatic lane change when the vehicle occupant (driver) gives an instruction. The second lane change control is a lane change control in which the automation rate is lower than that of the first lane change control or the degree of involvement in the vehicle operation required of the driver is increased. The lane change control to be described below in relation to the present embodiment is mainly the automatic lane change control performed by the system.

<Processing>

Figure 3:
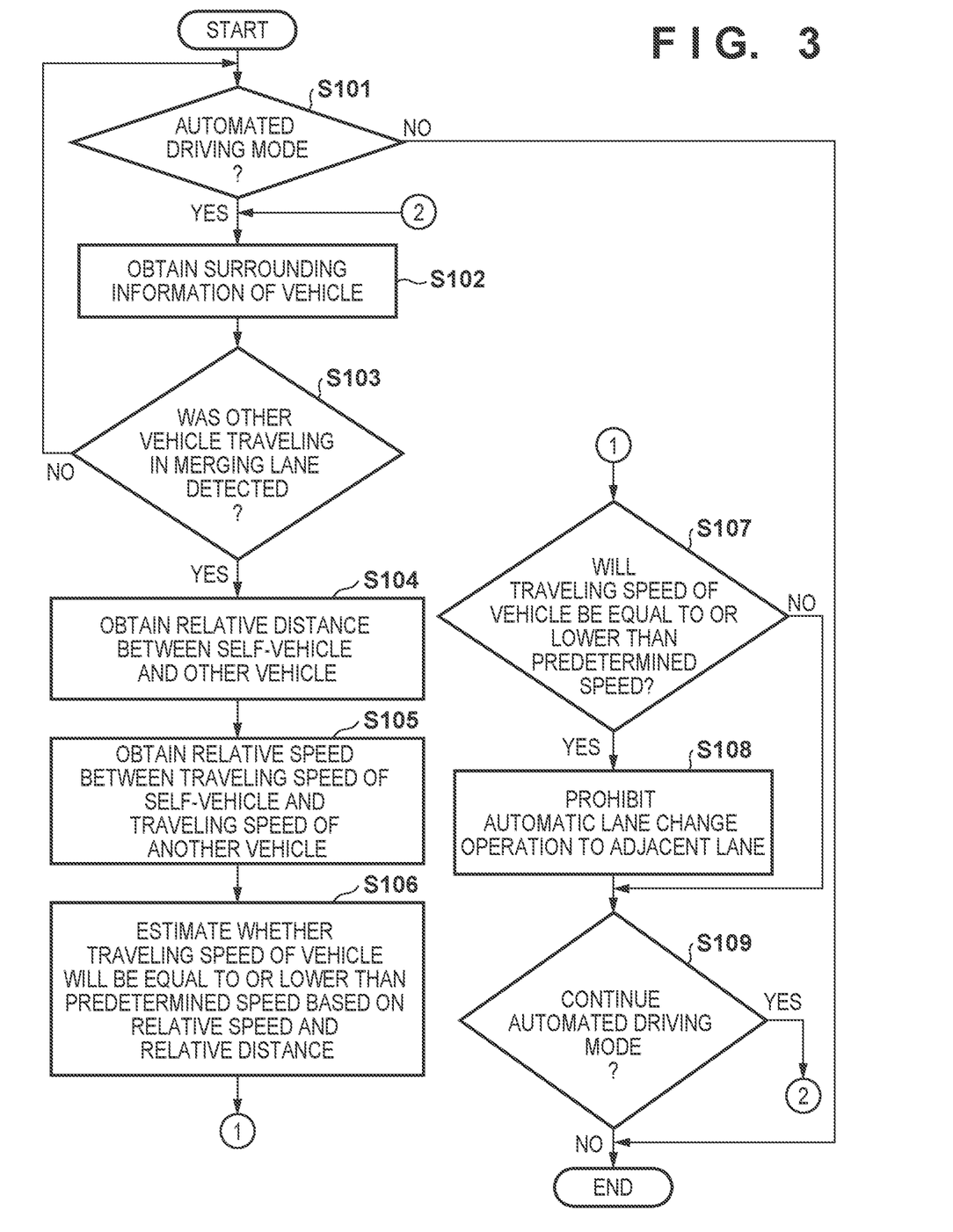
FIG. 3 is a flowchart for describing an example of a procedure of processing performed by a vehicle control device according to the embodiment.
Figure 4:
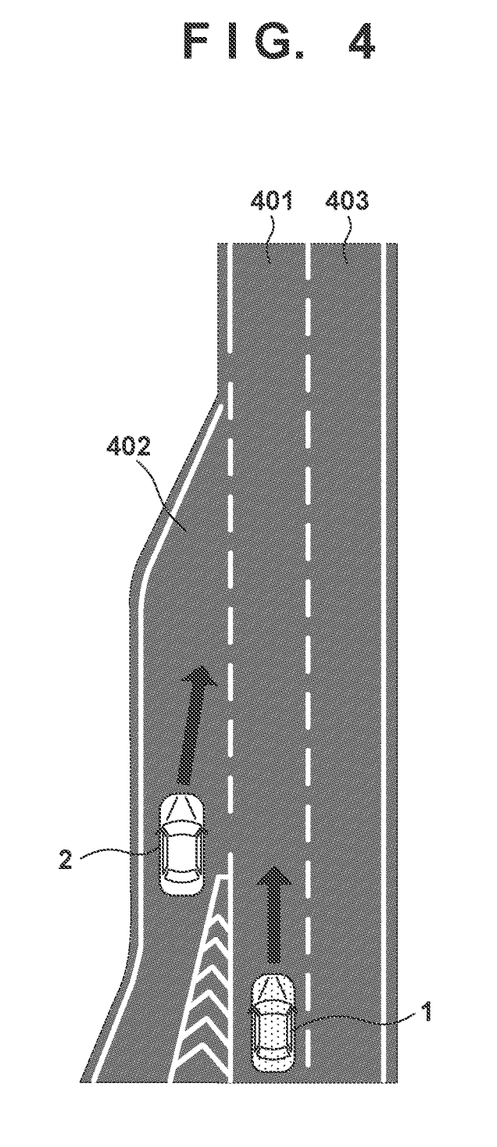
FIG. 4 is a schematic diagram illustrating an example of a merging lane and its vicinity according to the embodiment.

Processing in the present embodiment will be described in detail with reference to FIGS. 3 to 9. FIG. 3 is a flowchart for describing an example of a procedure of controlling the vehicle according to the present embodiment. FIG. 4 is a schematic diagram illustrating an example of a merging lane that merges into a traveling lane in which the self-vehicle according to the present embodiment is traveling. FIGS. 5 to 9 are diagrams illustrating examples of maps for performing estimation according to the present embodiment.

First, in step S101 described in FIG. 3 (hereinafter, simply referred to as "S101". The same applies to other steps), the vehicle control device 13 determines whether the operation mode of the vehicle 1 is the automated driving mode. If the operation mode is the automated driving mode, the process proceeds to S102, and otherwise (if the operation mode is the normal mode in which the driver performs all the driving operations), this flow is ended. The operation mode of the vehicle 1 can be switched between the normal mode and the automated driving mode by the driver (or a person who can be a driver when the automated driving is canceled) pushing a predetermined switch in the vehicle.

In S102, the vehicle control device 13 acquires surrounding information of the vehicle 1. This step is performed by the ECU 134 of the vehicle control device 13 acquiring the surrounding information of the vehicle 1 detected by the surroundings monitoring device 12. The vehicle control device 13 controls the operations (acceleration, braking, and/or steering) of the vehicle 1 based on the surrounding information.

In S103, the vehicle control device 13 detects whether another vehicle is traveling in the merging lane that merges into the traveling lane in which the vehicle 1 is traveling, on the basis of the surrounding information. In the present embodiment, a vehicle exclusive road such as an expressway will be taken as an example. As illustrated in FIG. 4, there is a merging lane 402 merging into a traveling lane 401 in which the vehicle 1 is traveling, and another vehicle 2 traveling in the merging lane 402 is detected. The passing lane 403 is a traveling lane adjacent to the traveling lane 401. The presence of the merging lane 402 may be detected based on the surrounding information. Alternatively, the presence of the merging lane 402 may be detected by collating information on the self-position acquired by a GPS sensor (not illustrated) provided in the vehicle 1 with map information held in advance. If the presence of the merging lane 402 is detected, the vehicle control device 13 detects whether there is the other vehicle 2 traveling in the merging lane 402. If the other vehicle traveling in the merging lane is detected (YES in S103), the process proceeds to S104. On the other hand, if no other vehicle traveling in the merging lane is detected, the process returns to S101.

In S104, the vehicle control device 13 acquires information on the relative distance (inter-vehicle distance) between the vehicle 1 and the other vehicle 2 based on the surrounding information.

In S105, the vehicle control device 13 acquires information on the relative speed between the traveling speed of the vehicle 1 and the traveling speed of the other vehicle 2. The information on the traveling speed of the vehicle 1 can be acquired from the speedometer of the vehicle 1. The information on the traveling speed of the other vehicle 2 can be acquired from the other vehicle 2 through, for example, inter-vehicle communication using a communication unit (not illustrated). Then, the relative speed can be calculated from the difference between the traveling speed of the vehicle 1 and the traveling speed of the other vehicle 2. Alternatively, the relative speed may be directly calculated from the time change in the relative distance acquired in S104 and the information on the traveling speed of the vehicle 1.

In S106, the vehicle control device 13 estimates whether the traveling speed of the vehicle 1 is a predetermined speed (for example, 60 km/h) or less based on the information on the relative speed acquired in S105 and the information on the relative distance acquired in S104. In the example of FIG. 4, the other vehicle 2 traveling in the merging lane will merge into the traveling lane 401 of the vehicle 1 in the near future, so that the other vehicle 2 will change its course toward ahead of the vehicle 1. When the speed of the other vehicle 2 is lower than that of the vehicle 1, the vehicle 1 automatically executes a braking operation in order to avoid collision. This step is a process of estimating whether the traveling speed of the vehicle 1 will be equal to or lower than a predetermined speed due to deceleration.

Here, the estimation processing will be described in detail with reference to FIGS. 5 to 9. FIGS. 5 to 9 are diagrams illustrating examples of a distribution of changes in the speed of the vehicle according to a relative speed and an inter-vehicle distance, and a relative threshold distance to be set. The horizontal axis represents a relative speed obtained by subtracting the traveling speed of the other vehicle from the traveling speed of the self-vehicle, and the vertical axis represents a relative distance between the self-vehicle traveling in the traveling lane and the other vehicle traveling in the merging lane. When the relative speed has a positive value, the traveling speed of the self-vehicle is faster than the traveling speed of the other vehicle, and the self-vehicle is likely to approach the other vehicle having merged into the traveling lane of the self-vehicle. On the other hand, when the relative speed is a negative value, the traveling speed of the other vehicle is faster than the traveling speed of the self-vehicle, and the self-vehicle is less likely to approach the other vehicle having merged into the traveling lane of the self-vehicle.

Figure 5:
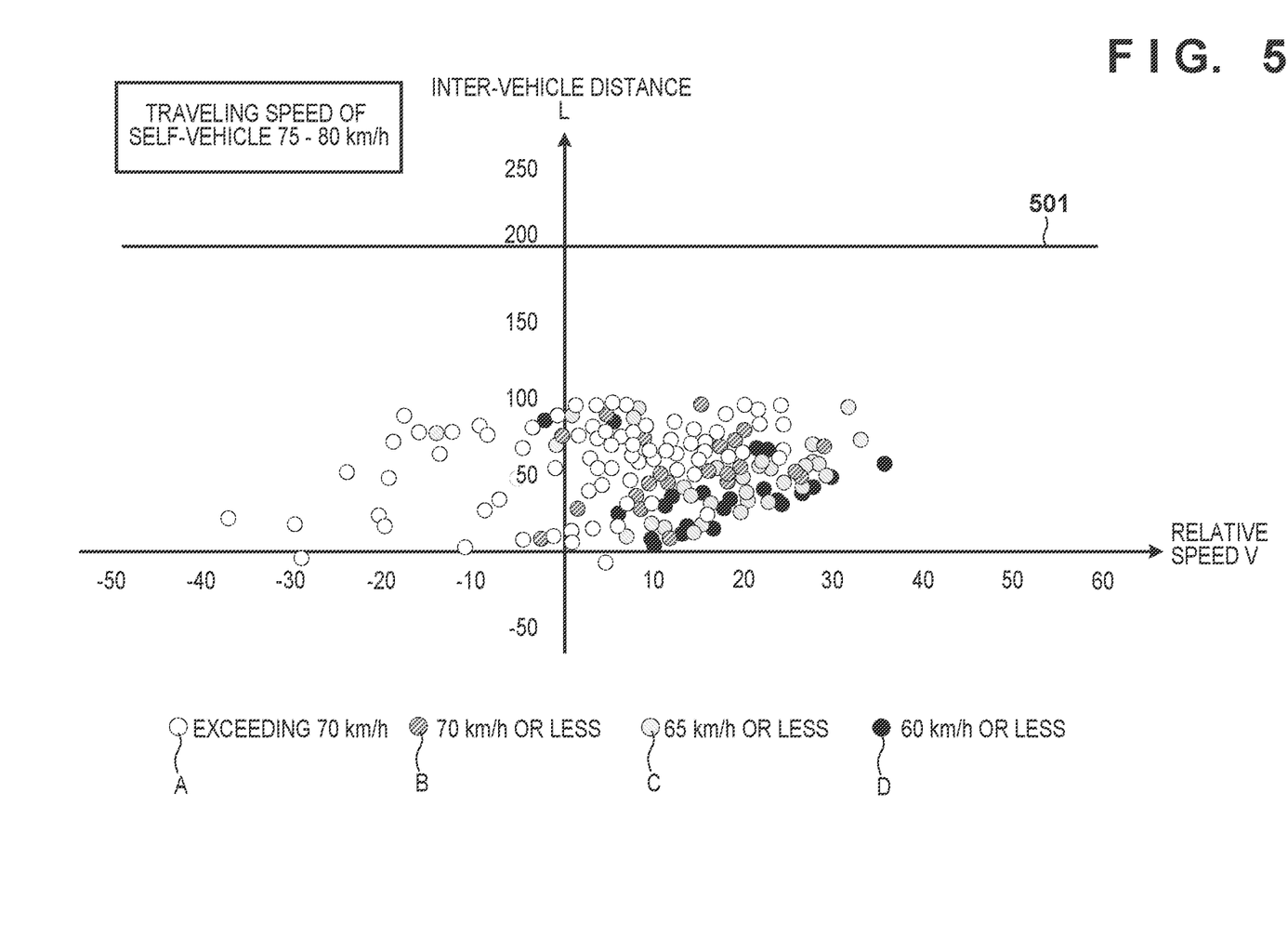
FIG. 5 is a diagram illustrating an example of a distribution of changes in the speed of the vehicle according to a relative speed and an inter-vehicle distance, and a relative threshold distance to be set in a case where the vehicle travels at 75 to 80 km/h according to the embodiment.
Figure 6:
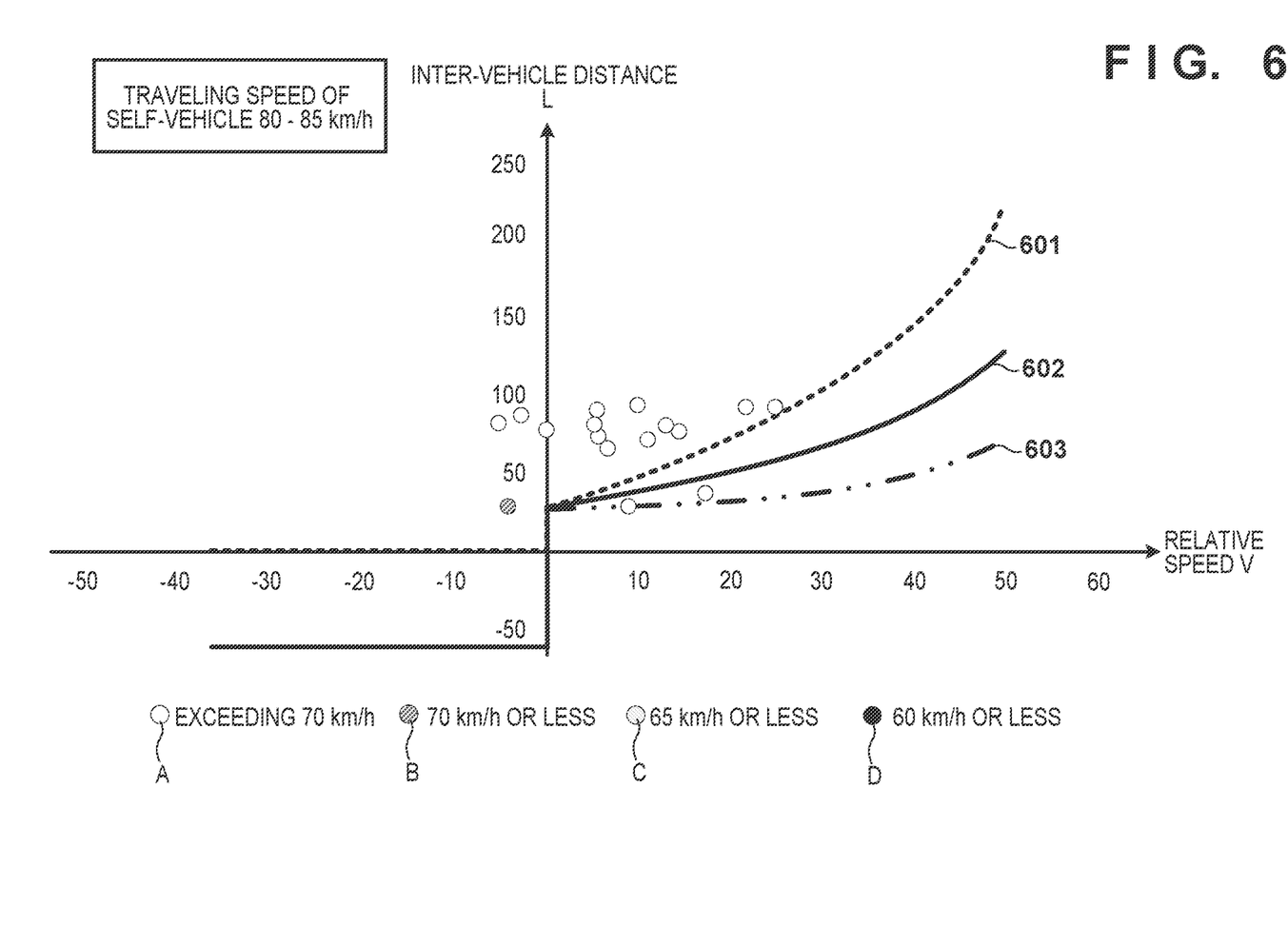
FIG. 6 is a diagram illustrating an example of a distribution of changes in the speed of the vehicle according to a relative speed and an inter-vehicle distance, and a relative threshold distance to be set in a case where the vehicle travels at 80 to 85 km/h according to the embodiment.
Figure 7:
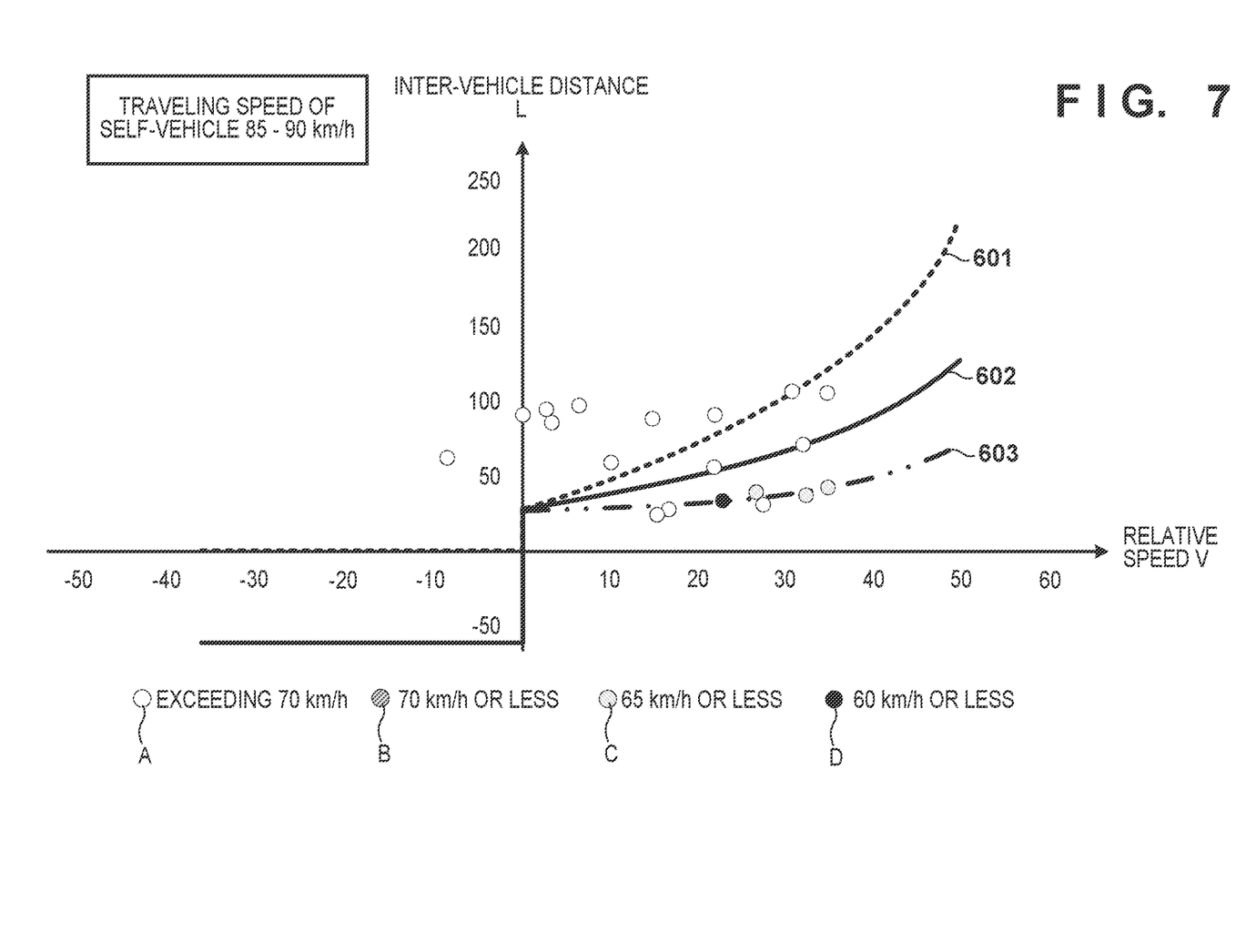
FIG. 7 is a diagram illustrating an example of a distribution of changes in the speed of the vehicle according to a relative speed and an inter-vehicle distance, and a relative threshold distance to be set in a case where the vehicle travels at 85 to 90 km/h according to the embodiment.
Figure 8:
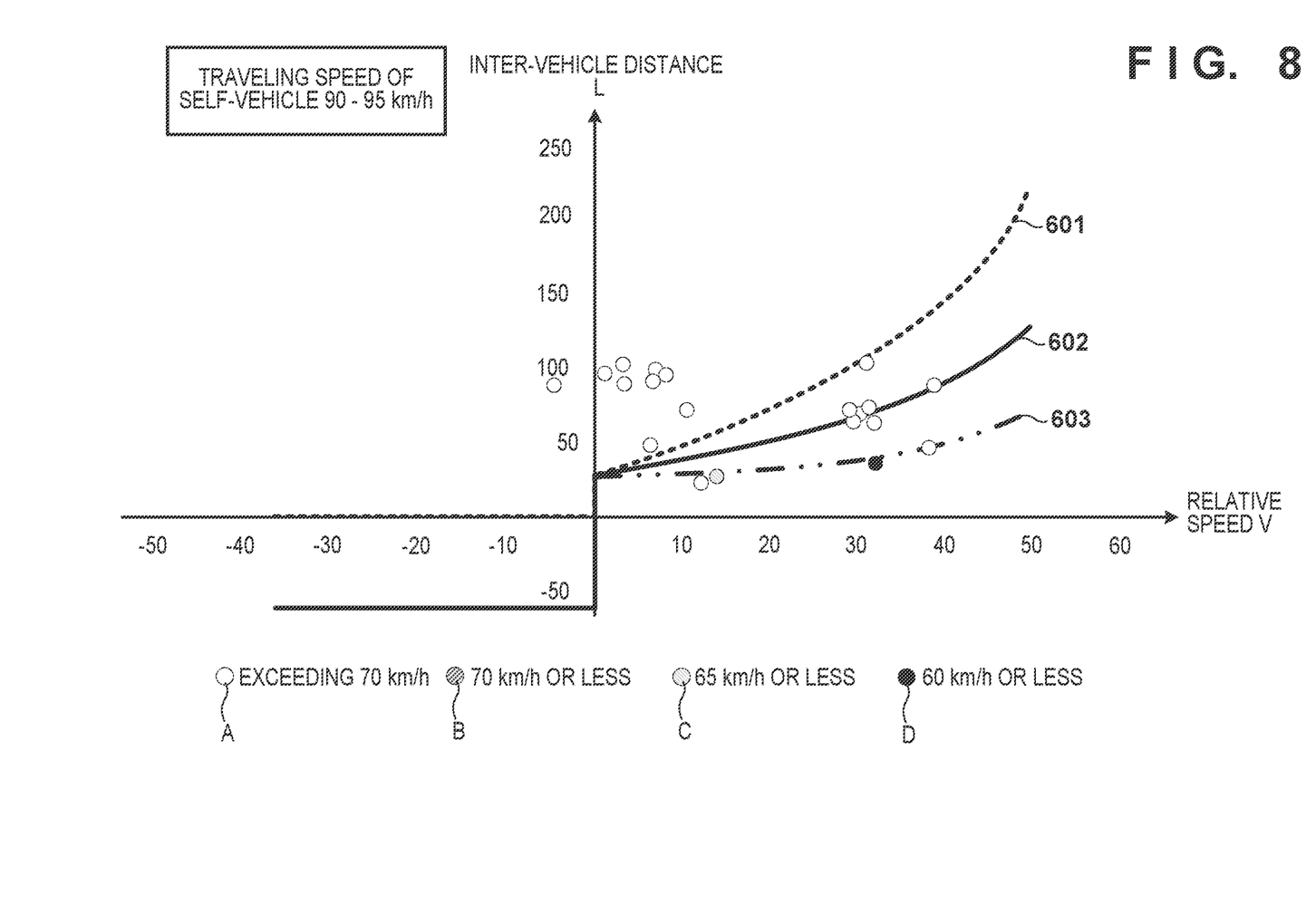
FIG. 8 is a diagram illustrating an example of a distribution of changes in the speed of the vehicle according to a relative speed and an inter-vehicle distance, and a relative threshold distance to be set in a case where the vehicle travels at 90 to 95 km/h according to the embodiment.
Figure 9:
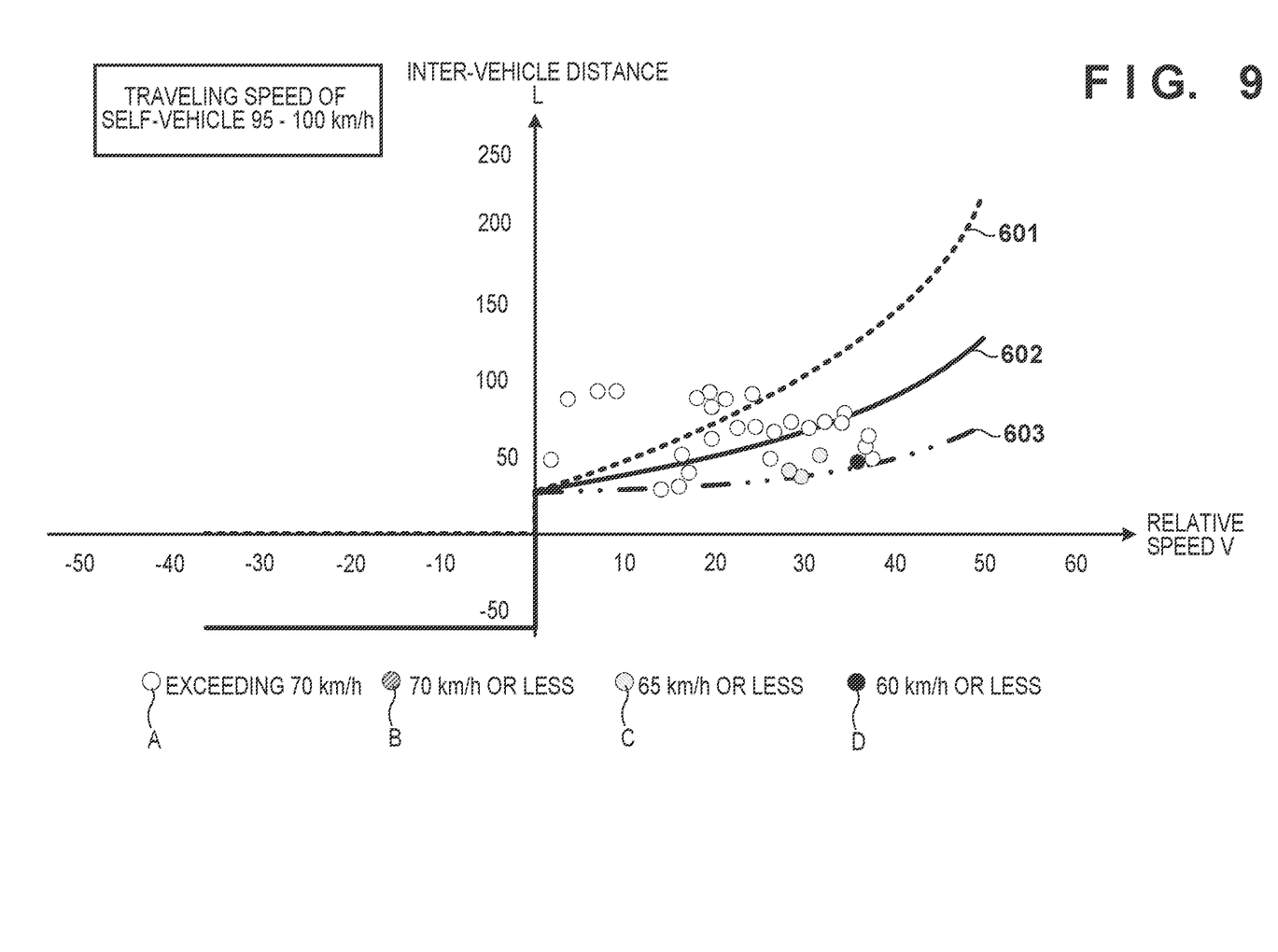
FIG. 9 is a diagram illustrating an example of a distribution of changes in the speed of the vehicle according to a relative speed and an inter-vehicle distance, and a relative threshold distance to be set in a case where the vehicle travels at 95 to 100 km/h according to the embodiment.

Each point in the point distribution of FIG. 5 indicates the measurement result of a change in the speed of the vehicle 1 (self-vehicle) according to the relative speed and the inter-vehicle distance when the traveling speed of the vehicle is 75 to 80 km/h. Points A indicate a case where the traveling speed exceeding 70 km/h could be maintained at the acquired relative speed and relative distance. Points B indicate a case where the traveling speed becomes 70 km/h or less (more than 65 km/h) at the acquired relative speed and relative distance. Points C indicate a case where the traveling speed becomes 65 km/h or less (more than 60 km/h) at the acquired relative speed and relative distance. Points D indicate a case where the traveling speed becomes 60 km/h or less at the acquired relative speed and relative distance. Travel data at various relative speeds and relative distances were measured in advance, and measurement results are plotted as many points A, B, C, and D.

In the automated driving, when there occurs a large deceleration to a predetermined speed (for example, 60 km/h) or less, even if the vehicle 1 (self-vehicle) has started an automatic lane change operation during the automated driving, the vehicle 1 stops the operation halfway and performs a process of staying in the traveling lane. If the vehicle 1 traveling at a low speed changes to the passing lane in which another vehicle can travel at a high speed, the other vehicle may need to abruptly decelerate. Thus, the vehicle 1 stays in the traveling lane to prevent the occurrence of such a situation.

However, if the vehicle 1 frequently stops the automatic lane change operation started once halfway due to the presence of another vehicle traveling in the merging lane, the ride comfort may be affected. Therefore, the self-vehicle is controlled from the beginning such that the automatic lane change operation is disabled if it is estimated that the speed of the self-vehicle will be a predetermined speed or less due to merge of another vehicle from the merging lane into the traveling lane of the self-vehicle. This makes it possible to suppress inadvertent occurrence of the start and stop of the automatic lane change operation, thereby realizing more comfortable automated driving for the occupant.

Specifically, relative threshold distances corresponding to relative speeds are defined in advance, and when information on a certain relative speed and a certain relative distance is acquired, it is determined whether the relative distance is equal to or less than the relative threshold distance corresponding to the relative speed. Then, if the relative distance at a certain relative speed is equal to or less than the relative threshold distance, it is estimated that there will occur a large deceleration to a predetermined speed (for example, 60 km/h) or less.

In the example of FIG. 5, the points D are distributed in a wide range, and it can be seen that the traveling speed can be 60 km/h or less even at various relative speeds and relative distances. That is, as in the example of FIG. 5, when the traveling speed of the self-vehicle is 75 to 80 km/h, it is considered that the traveling speed may become 60 km/h or less at any relative speed and relative distance. Therefore, in this case, a straight line having a constant relative threshold distance at any relative speed is defined, for example, such as a straight line indicated by 501. In the illustrated example, the relative threshold distance is 200 m. This is merely an example, and other values may be used. Since the detection limit distance of the relative distance is about 100 m, setting a value exceeding 100 m (e.g. 120 m, 150 m, or 250 m) as the relative threshold distance allows the relative distance to be equal to or less than the relative threshold distance regardless of the relative speed. Therefore, when the traveling speed of the self-vehicle is 75 to 80 km/h, it can be estimated that there will occur a large deceleration by which the traveling speed of the self-vehicle will be a predetermined speed (for example, 60 km/h) or less.

Next, cases where the traveling speed of the self-vehicle is higher than that in the example of FIG. 5 will be described with reference to FIGS. 6 to 9. Each point in the point distribution of FIG. 6 indicates the measurement result of a change in the speed of the vehicle 1 (self-vehicle) according to the relative speed and the inter-vehicle distance when the traveling speed of the vehicle is 80 to 85 km/h. Each point in the point distribution of FIG. 7 indicates the measurement result of a change in the speed of the vehicle 1 (self-vehicle) according to the relative speed and the inter-vehicle distance when the traveling speed of the vehicle is 85 to 90 km/h. Each point in the point distribution of FIG. 8 indicates the measurement result of a change in the speed of the vehicle 1 (self-vehicle) according to the relative speed and the inter-vehicle distance when the traveling speed of the vehicle is 90 to 95 km/h. Each point in the point distribution of FIG. 9 indicates the measurement result of a change in the speed of the vehicle 1 (self-vehicle) according to the relative speed and the inter-vehicle distance when the traveling speed of the vehicle is 90 to 100 km/h. Respective points A to D in the drawings are similar to those described above with reference to FIG. 5.

Respective curves 601 to 603 in FIGS. 6 to 9 are examples of curves indicating the relative threshold distance according to the relative speed. These curves are candidates for reference curves indicating the relationship between the relative speed between the self-vehicle and the other vehicle and the relative threshold distance between the self-vehicle and the other vehicle as a reference for disabling the automatic lane change operation.

The vehicle control device 13 calculates the relative threshold distance from the relative speed between the vehicle 1 and the other vehicle 2 based on information on the reference curve (for example, when the curve 602 is adopted, the curve 602 is the reference curve) stored in a memory not illustrated. Then, the vehicle control device 13 determines whether the relative distance between the vehicle 1 and the other vehicle 2 is equal to or less than the calculated relative threshold distance. If the relative distance is equal to or less than the relative threshold distance, the vehicle control device 13 estimates that the traveling speed of the self-vehicle will be equal to or less than the predetermined speed. That is, when the information on a certain relative speed and relative distance is acquired, if the relative distance plotted on a graph is equal to or less than the threshold relative distance, the vehicle control device 13 estimates that the traveling speed of the vehicle 1 will be equal to or less than the predetermined speed.

Here, the curve 601 is a curve in the case of a first deceleration (for example, 0.5 m/s$^2$) corresponding to the accelerator pedal being in the off state. The curve 602 is a curve in the case of a second deceleration (for example, 1.0 m/s$^2$) corresponding to regular brake. The curve 603 is a curve in the case of a third deceleration (for example, 2.0 m/s$^2$) corresponding to the maximum braking. Each curve is represented by the following equation (1):

[MATH. 1]

$$S_{critical} = (v_{ACSF} - v_{tgt}) * t_B + \frac{(v_{ACSF} - v_{tgt})^2}{2 * a} + v_{ACSF} * t_G \quad (1)$$

where "$S_{critical}$" indicates the relative threshold distance. $V_{ACSF}$ is the traveling speed of the self-vehicle, $V_{tgt}$ is the traveling speed of another vehicle, $t_B$ is the brake reaction time, a is the deceleration, and $t_G$ is the inter-vehicle spacing time. $(V_{ACSF}-V_{tgt})*t_B$ represents the idling distance. $(V_{ACSF}-V_{tgt})^2/(2*a)$ represents the distance clogged during deceleration. $V_{ACSF}*t_G$ represents the margin distance. A curve with a in equation (1) of 0.5 m/s² corresponds to the curve 601, a curve with a in equation (1) of 1.0 m/s² corresponds to the curve 602, and a curve with a in equation (1) of 2.0 m/s² corresponds to the curve 603.

With regard to the point distributions in FIGS. 6 to 9, the distributions of the points D (60 km/h or less) are not necessarily included in the lower region with respect to the curve 603. Here, the lower region means not a part of the curve but a region exclusive of the curve that is defined by the curve. On the other hand, since the distributions of the points D (60 km/h or less) are included in the lower region with respect to the curve 601, the curve 601 may be defined as the relative threshold distance. Alternatively, since the distributions of the points D (60 km/h or less) are also included in the lower region with respect to the curve 602, the curve 602 may be defined as the relative threshold distance.

The relative threshold distance is desirably set to be as small as possible. This is because, if the relative threshold distance is long, it will be more frequently estimated that the self-vehicle will decelerate to a predetermined speed or less, which leads to an increase in unnecessary disabling of the automatic lane change operation. On the other hand, as described above, if the curve 603 is defined as the reference curve of the relative threshold distance, the automatic lane change operation may not be disabled even though the traveling speed of the self-vehicle is 60 km/h or less. As an example, the curve 602 between the curves 601 and 603 is defined and adopted as a reference curve of the relative threshold distance. This makes it possible to prevent the traveling speed of the self-vehicle from becoming 60 km/h or less and to reduce unnecessary disabling of the automatic lane change operation.

However, the curve 602 is merely an example of the reference curve of the relative threshold distance, and it is needless to say that another curve (including a straight line) may be used. For example, another curve may be defined between the curve 602 and the curve 603 and employed as the reference curve. Any curve (including a straight line) may be used as long as the positions of all the points D at which the traveling speed of the self-vehicle is 60 km/h or less are included in the lower region with respect to the curve (including a straight line). Information on the reference curve is stored in advance in a memory (not illustrated).

As described above, the reference curve (straight line 501) of the relative threshold distance as illustrated in FIG. 5 is defined, so that, when the traveling speed of the self-vehicle is equal to or lower than the reference speed (for example, 80 km/h), it is uniformly estimated that the traveling speed of the vehicle 1 will be equal to or lower than the predetermined speed (for example, 60 km/h). On the other hand, the reference curve (curve 602) of the relative threshold distance as illustrated in FIGS. 6 to 9 is defined, so that, when the traveling speed of the self-vehicle exceeds the reference speed (for example, 80 km/h), it is estimated whether the traveling speed of the vehicle 1 will be equal to or lower than a predetermined speed (for example, 60 km/h) based on the reference curve (curve 602) of the relative threshold distance.

In S107, the vehicle control device 13 determines whether the traveling speed of the vehicle 1 will be a predetermined speed (for example, 60 km/h) or less based on the result of the estimation in S106. When the vehicle control device 13 determines that the traveling speed of the vehicle 1 will be equal to or lower than the predetermined speed, the process proceeds to S108. On the other hand, w the vehicle control device 13 determines that the traveling speed of the vehicle 1 will not be equal to or lower than the predetermined speed, the process proceeds to S109.

In S108, the vehicle control device 13 disables the automatic lane change operation of the vehicle 1 to the lane adjacent to the traveling lane (the passing lane 403 adjacent to the traveling lane 401 in the example of FIG. 4).

In S109, the vehicle control device 13 determines whether to continue the operation mode of the vehicle 1 as the automated driving mode. When the automated driving mode is to be continued, the process returns to S102, and when the automated driving mode is not to be continued, this flow is ended. Accordingly, the series of processes in FIG. 3 is ended.

As described above, in the present embodiment, it is estimated whether the traveling speed of the self-vehicle will be equal to or less than the predetermined speed, based on the relative speed between the traveling speed of the self-vehicle and the traveling speed of another vehicle traveling in the merging lane merging into the traveling lane in which the self-vehicle is traveling and based on the relative distance between the self-vehicle and the other vehicle. When it is estimated that the traveling speed of the self-vehicle will be equal to or less than the predetermined speed, the self-vehicle is disabled from performing the automatic lane change operation to the lane adjacent to the traveling lane.

This makes it possible to prevent the self-vehicle from decelerating due to the presence of another merging vehicle even though the automatic lane change operation for passing has started, and prevent the automatic lane change operation from being stopped halfway due to the deceleration.

[Modifications]

In the above-described embodiment, when it is estimated that the traveling speed of the vehicle becomes equal to or less than the predetermined speed, the automatic lane change operation of the self-vehicle to the lane adjacent to the traveling lane is disabled. Further, in addition to disabling the automatic lane change operation, the automated driving level of the vehicle may be decreased. For example, the travel control may be changed to a travel control in which the automation rate is relatively low or the degree of involvement in the vehicle operations required of the driver is relatively increased.

In addition, the information on the traveling speed of another vehicle and the relative distance to the other vehicle may be acquired only at the timing when the other vehicle is first detected. This makes it possible to determine disabling/enabling of the automatic lane change operation in a sufficient time. This also makes it possible to prevent the disabling/enabling from changing many times by executing the process a plurality of times.

<Other Embodiments>

In addition, a vehicle control program for performing one or more functions described in relation to the embodiments is supplied to a system or apparatus through a network or a storage medium, and one or more processors in a computer of the system or apparatus can read and execute the program. The present invention is also achievable by such an aspect.

According to the present invention, it is possible to prevent the automatic lane change operation from being stopped halfway. Therefore, more comfortable automated driving can be realized.

<Summary of Embodiments>

Configuration 1. A vehicle control device according to the above embodiment is
- a vehicle control device (for example, 13) that controls a self-vehicle (for example, 1), the vehicle control device including:
- an acquisition unit (for example, 12) that acquires surrounding information of the self-vehicle; and
- a control unit (for example, 131 to 134) that controls traveling of the self-vehicle based on the surrounding information, wherein
- the control unit estimates whether a traveling speed of the self-vehicle will be equal to or less than a predetermined speed based on a relative speed between a traveling speed of the self-vehicle and a traveling speed of another vehicle (for example, 2) traveling in a merging lane (for example, 402) merging into a traveling lane (for example, 401) in which the self-vehicle is traveling and based on a relative distance between the self-vehicle and the other vehicle, and
- when estimating that the traveling speed of the self-vehicle will be equal to or less than the predetermined speed, the control unit disables an automatic lane change operation of the self-vehicle to an adjacent lane (for example, 403) adjacent to the traveling lane.

This makes it possible to prevent the self-vehicle from decelerating due to the presence of another merging vehicle even though the automatic lane change operation for passing has started, and prevent the automatic lane change operation from being stopped halfway due to the deceleration. Therefore, more comfortable automated driving can be realized.

Configuration 2. In the vehicle control device of the above embodiment,
the predetermined speed is 60 km/h.

As a result, when it is estimated that the traveling speed of the self-vehicle is 60 km/h or less, it is possible to prohibit the automatic lane change operation of the self-vehicle, and thus, it is possible to realize automated driving with higher safety.

Configuration 3. In the vehicle control device of the above embodiment,
if the traveling speed of the self-vehicle is equal to or lower than a reference speed (for example, 80 km/h) when the other vehicle is detected, the control units estimates that the traveling speed of the self-vehicle will be equal to or lower than the predetermined speed regardless of the relative speed and the relative distance.

As a result, when the traveling speed of the self-vehicle is equal to or lower than the reference speed and it is statistically likely that the traveling speed of the self-vehicle will be equal to or lower than the predetermined speed, the automatic lane change operation can be uniformly disabled.

Configuration 4. In the vehicle control device of the above embodiment,
the reference speed is 80 km/h.

As a result, when the traveling speed of the self-vehicle is 80 km/h or less where it is statistically known that the traveling speed of the self-vehicle is highly likely to be equal to or less than the predetermined speed, the automatic lane change operation can be uniformly disabled.

Configuration 5. The vehicle control device of the above embodiment further includes
- a storage unit that stores information on a reference curve (for example, 501 and 602) indicating a relationship between the relative speed between the self-vehicle and the other vehicle and a relative threshold distance between the self-vehicle and the other vehicle, the relative threshold distance serving as a reference for disabling the automatic lane change operation, wherein
the control unit
- calculates the relative threshold distance from the relative speed between the self-vehicle and the other vehicle based on the reference curve,
- determines whether the relative distance between the self-vehicle and the other vehicle is equal to or less than the calculated relative threshold distance, and
- estimates that the traveling speed of the self-vehicle will be equal to or less than the predetermined speed if the relative distance is equal to or less than the relative threshold distance.

This makes it possible to easily estimate whether the traveling speed of the self-vehicle will be equal to or less than the predetermined speed on the basis of the relative speed, the relative distance, and the relative threshold distance on the reference curve.

Configuration 6. In the vehicle control device of the above embodiment,
- the reference curve is a curve determined according to deceleration of the self-vehicle, and
- the reference curve is a curve (for example, 602) corresponding to a third deceleration (for example, 1.0 m/s$^2$) between a first deceleration (for example, 0.5 m/s$^2$) with an accelerator pedal of the self-vehicle in the off state and a second deceleration (for example, 2.0 m/s$^2$) with maximum braking of the self-vehicle.

This makes it possible to prevent the traveling speed of the self-vehicle from becoming a predetermined speed (for example, 60 km/h or less) and to reduce unnecessary disabling of the automatic lane change operation. That is, it is possible to apply the disabling of automatic lane change in a limited manner depending on the situation where it is necessary.

Configuration 7. In the vehicle control device of the above embodiment,
the third deceleration is 1.0 m/s$^2$.

This makes it possible to prevent the traveling speed of the self-vehicle from becoming a predetermined speed (for example, 60 km/h or less) and to reduce unnecessary disabling of the automatic lane change operation. That is, it is possible to apply the disabling of automatic lane change in a limited manner depending on the situation where it is necessary.

Configuration 8. An operation method of a vehicle control device according to the above embodiment is
an operation method of a vehicle control device (for example, 13) that controls a self-vehicle (for example, 1), the operation method including:
- acquiring surrounding information of the self-vehicle (for example, S102); and
- controlling traveling of the self-vehicle based on the surrounding information (for example, S103 to S109), wherein,
in the controlling,
it is estimated whether a traveling speed of the self-vehicle will be equal to or less than a predetermined speed based on a relative speed between a traveling speed of the self-vehicle and a traveling speed of another vehicle (for example, 2) traveling in a merging lane (for example, 402) merging into a traveling lane (for example, 401) in which the self-vehicle is traveling and based on a relative distance between the self-vehicle and the other vehicle (for example, S103 to S106), and when it is estimated that the traveling speed of the self-vehicle will be equal to or less than the predetermined speed, an automatic lane change operation of the self-vehicle to an adjacent lane (for example, 403) adjacent to the traveling lane is disabled (for example, S107 to S108).

This makes it possible to prevent the self-vehicle from decelerating due to the presence of another merging vehicle even though the automatic lane change operation for passing has started, and prevent the automatic lane change operation from being stopped halfway due to the deceleration. Therefore, more comfortable automated driving can be realized.

Configuration 10. A program in the above embodiment is a program for causing a computer to function as the vehicle control device (for example, 13) according to any of the configurations 1 to 7.

As a result, the processing of the vehicle control device can be realized by the computer.

The invention is not limited to the foregoing embodiments, and various variations/changes are possible within the spirit of the invention.

What is claimed is:

1. A vehicle control device that controls a self-vehicle, comprising:
   one or more memories storing instructions; and
   one or more processors executing the instructions to:
   acquire surrounding information of the self-vehicle; and
   control traveling of the self-vehicle based on the surrounding information, wherein
   the one or more processors further execute the instructions to:
   estimate whether a traveling speed of the self-vehicle will be equal to or less than a predetermined speed based on a relative speed between a traveling speed of the self-vehicle and a traveling speed of another vehicle traveling in a merging lane merging into a traveling lane in which the self-vehicle is traveling and based on a relative distance between the self-vehicle and the other vehicle, and
   when estimating that the traveling speed of the self-vehicle will be equal to or less than the predetermined speed, disable an automatic lane change operation of the self-vehicle to an adjacent lane adjacent to the traveling lane,
   wherein the automatic lane change operation is not an operation in which the self-vehicle performs a lane change from the traveling lane to the merging lane but an operation in which the self-vehicle performs a lane change from the traveling lane to the adjacent lane adjacent to the traveling lane, where the traveling lane is between the merging lane and the adjacent lane,
   the vehicle control device further comprising:
   a storage unit configured to store information on a reference curve indicating a relationship between the relative speed between the self-vehicle and the other vehicle and a relative threshold distance between the self-vehicle and the other vehicle, the relative threshold distance serving as a reference for disabling the automatic lane change operation, wherein the one or more processors further execute the instructions to:
   calculate the relative threshold distance from the relative speed between the self-vehicle and the other vehicle based on the reference curve,
   determine whether the relative distance between the self-vehicle and the other vehicle is equal to or less than the calculated relative threshold distance, and
   estimate that the traveling speed of the self-vehicle will be equal to or less than the predetermined speed if the relative distance is equal to or less than the relative threshold distance.

2. The vehicle control device according to claim 1, wherein the predetermined speed is 60 km/h.

3. The vehicle control device according to claim 1, wherein, if the traveling speed of the self-vehicle is equal to or lower than a reference speed when the other vehicle is detected, the one or more processors further execute the instructions to estimate that the traveling speed of the self-vehicle will be equal to or lower than the predetermined speed regardless of the relative speed and the relative distance.

4. The vehicle control device according to claim 3, wherein the reference speed is 80 km/h.

5. The vehicle control device according to claim 1, wherein
   the reference curve is a curve determined according to deceleration of the self-vehicle, and
   the reference curve is a curve corresponding to a third deceleration between a first deceleration with an accelerator pedal of the self-vehicle in an off state and a second deceleration with maximum braking of the self-vehicle.

6. The vehicle control device according to claim 5, wherein the third deceleration is 1.0 m/s$^2$.

7. An operation method of a vehicle control device that controls a self-vehicle, the operation method comprising:
   acquiring surrounding information of the self-vehicle; and
   controlling traveling of the self-vehicle based on the surrounding information, wherein
   in the controlling,
   it is estimated whether a traveling speed of the self-vehicle will be equal to or less than a predetermined speed based on a relative speed between a traveling speed of the self-vehicle and a traveling speed of another vehicle traveling in a merging lane merging into a traveling lane in which the self-vehicle is traveling and based on a relative distance between the self-vehicle and the other vehicle, and
   when it is estimated that the traveling speed of the self-vehicle will be equal to or less than the predetermined speed, an automatic lane change operation of the self-vehicle to an adjacent lane adjacent to the traveling lane is disabled, and
   wherein the automatic lane change operation is not an operation in which the self-vehicle performs a lane change from the traveling lane to the merging lane but an operation in which the self-vehicle performs a lane change from the traveling lane to the adjacent lane adjacent to the traveling lane, where the traveling lane is between the merging lane and the adjacent lane,
   the controlling further comprises:
   storing information on a reference curve indicating a relationship between the relative speed between the self-vehicle and the other vehicle and a relative threshold distance between the self-vehicle and the other vehicle, the relative threshold distance serving as a reference for disabling the automatic lane change operation, calculating the relative threshold distance from the relative speed between the self-vehicle and the other vehicle based on the reference curve, determining whether the relative distance between the self-vehicle and the other vehicle is equal to or less than the calculated relative threshold distance, and estimating that the traveling speed of the self-vehicle will be equal to or less than the predetermined speed if the relative distance is equal to or less than the relative threshold distance.

8. A non-transitory computer-readable storage medium storing a program for causing a computer to execute an operation method of a vehicle control device that controls a self-vehicle, the operation method comprising:

acquiring surrounding information of the self-vehicle; and controlling traveling of the self-vehicle based on the surrounding information, wherein in the controlling, it is estimated whether a traveling speed of the self-vehicle will be equal to or less than a predetermined speed based on a relative speed between a traveling speed of the self-vehicle and a traveling speed of another vehicle traveling in a merging lane merging into a traveling lane in which the self-vehicle is traveling and based on a relative distance between the self-vehicle and the other vehicle, and when it is estimated that the traveling speed of the self-vehicle will be equal to or less than the predetermined speed, an automatic lane change operation of the self-vehicle to an adjacent lane adjacent to the traveling lane is disabled, and wherein the automatic lane change operation is not an operation in which the self-vehicle performs a lane change from the traveling lane to the merging lane but an operation in which the self-vehicle performs a lane change from the traveling lane to the adjacent lane adjacent to the traveling lane, where the traveling lane is between the merging lane and the adjacent lane, the controlling further comprises:

storing information on a reference curve indicating a relationship between the relative speed between the self-vehicle and the other vehicle and a relative threshold distance between the self-vehicle and the other vehicle, the relative threshold distance serving as a reference for disabling the automatic lane change operation, calculating the relative threshold distance from the relative speed between the self-vehicle and the other vehicle based on the reference curve, determining whether the relative distance between the self-vehicle and the other vehicle is equal to or less than the calculated relative threshold distance, and estimating that the traveling speed of the self-vehicle will be equal to or less than the predetermined speed if the relative distance is equal to or less than the relative threshold distance.

* * * * *